United States Patent [19]

Bos et al.

[11] 4,442,764
[45] Apr. 17, 1984

[54] MACHINE FOR PEELING AND CLEANING FOODSTUFFS, PARTICULARLY VEGETABLES SUCH AS ONIONS

[75] Inventors: Pierre H. Bos; Joël R. Musseau; Claude Rochez, all of Aubusson, France

[73] Assignee: Dito-Sama, Aubusson, France

[21] Appl. No.: 419,813

[22] Filed: Sep. 20, 1982

[30] Foreign Application Priority Data

Sep. 23, 1981 [FR] France ................. 81 17924

[51] Int. Cl.³ .................... A23N 7/00; A23N 7/02; A47J 17/00; A47J 17/18
[52] U.S. Cl. ......................... 99/633; 99/629
[58] Field of Search ........ 99/516, 534, 536, 509–511, 99/584, 623, 626, 628, 629–634; 241/38, 91, 278 R

[56] References Cited

U.S. PATENT DOCUMENTS

| | | | |
|---|---|---|---|
| 1,902,506 | 3/1933 | Johnston et al. | 99/633 |
| 2,044,563 | 6/1936 | Carter | 99/631 X |
| 2,795,253 | 6/1957 | Coleman et al. | 99/633 |
| 2,938,556 | 5/1960 | DeMille | 99/633 |
| 4,335,650 | 6/1982 | Prevot | 99/631 X |

Primary Examiner—Timothy F. Simone
Attorney, Agent, or Firm—Hauke and Patalidis

[57] ABSTRACT

The machine comprises a container supported by settable legs so as to make the machine perfectly vertical on its support. The container contains a filter opening into a discharge duct and supporting at its upper portion a cylinder containing at its base a motor and reduction gear assembly driving a central vertical shaft, said assembly being covered by a fixed bottom formed with a radial opening connected to a nozzle emerging above the aforementioned filter. The machine has a disc having at least one boss in relief driven by the shaft and coated on its upper portion with an abrasive layer. The cylinder is closed by a water tight cover through which the products to be cleaned have been introduced while said products are discharged after having been cleaned through a door placed in front of a discharge chute. The fixed bottom is shaped so as to cooperate with the bottom of rotating disc due to the fact that said disc comprises fins promoting the disengagement, in cooperation with the top of the fixed shaped bottom of the scraps and washing liquid by causing, by the rotation of the disc the lower face of which comprises the fins, a pumping effect projecting this liquid plus scraps mixture toward the discharge nozzle.

10 Claims, 8 Drawing Figures

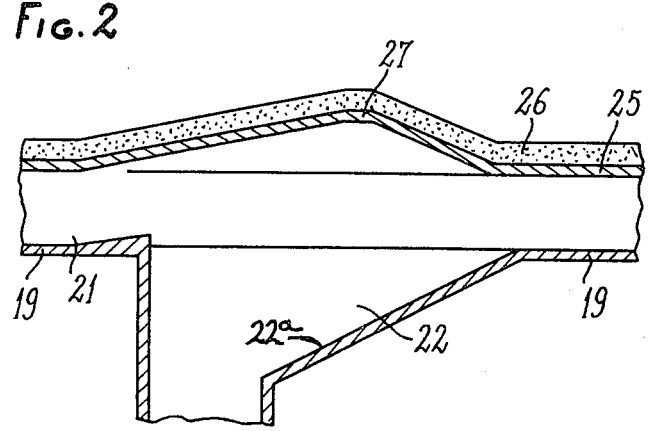
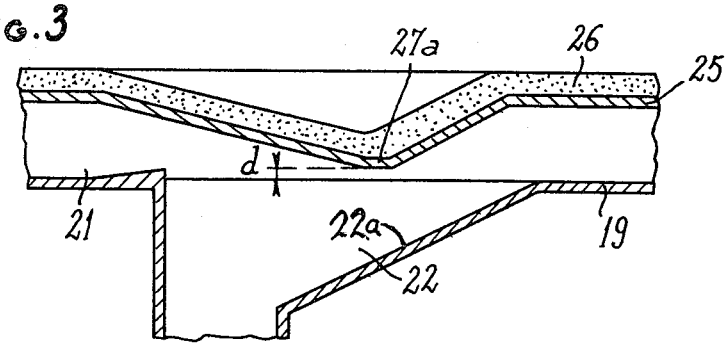
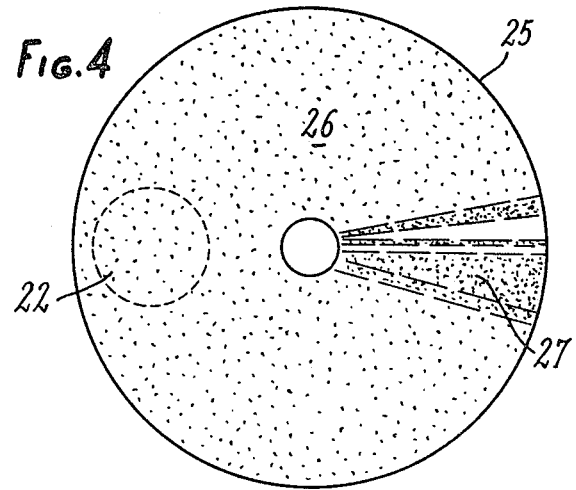

MACHINE FOR PEELING AND CLEANING FOODSTUFFS, PARTICULARLY VEGETABLES SUCH AS ONIONS

BACKGROUND OF THE INVENTION

Machines for peeling and cleaning vegetables, fruit and other foodstuffs are already known, but they have not yet given satisfaction when the problem is to peel and clean onions and garlics.

Indeed, the machines existing on the market for peeling vegetables and which have also to peel onions are generally designed according to the principle of a plate rotating in a fixed and substantially cylindrical chamber, the work being obtained by a stirring action of the products in the chamber which brings about, successively in contact with active surfaces, that is surfaces with a more or less rough finish, each element of the charge formed by the vegetables in order to clean them. A discharge permits eliminating the skins and scraps as they are produced, either through the combined effort of the rotation of the plate and the rotation speed of the vegetables, or through the same effort plus a distribution of water which is done under a variable head.

These machines can be classified under three groups which are the following:

(1) The first group comprises machines having a plate and a cylinder coated with abrasives, with a discharge on the side or underneath. These machines generally give excellent results when cleaning tubers, but they are hardly suitable for onions since, in fact, they hurt the flesh rather deeply and consume a large portion of the product. Moreover, evacuation of the skins is difficult since the skins adhere to the wall of the cylinder, which requires cleaning, and, by way of consequence causes hygiene problems. Finally, this arrangement prevents the problem of replacement of the active portion of the cylinder in after-sale service.

(2) The second group consists in using a smooth plate and in having thus a cylinder coated with abrasive provided with a side discharge. These machines are hardly suitable for peeling tubers due to their low efficiency, and they are therefore generally used for peeling only a product such as onions. The results obtained reveal a poor renewal of the charge, and therefore an irregular work, a poor evacuation of the skins which stick to the cylinder, thereby proportionally reducing the efficiency. Finally the side discharge presents also the problem of an added recovery device which increases substantially the overall size of the machine and, moreover, is liable to breakdowns; hence a poor work with a machine of relatively high cost price.

(3) The third group is composed of a hybrid system with a plate coated with an abrasive or cutting blades and a smooth cylinder comprising a deflection ramp, the evacuation being carried out sideways. These machines improve the quality of the work but they still have the disadvantage of a considerable overall size, and moreover it is absolutely necessary to provide an extra recovery system which is outside the volume of the machine. Therefore, such machines have to be considered as not currently usable since their maintenance is difficult, and their cost price high.

OBJECTS AND SUMMARY OF THE INVENTION

The present invention remedies these disadvantages by providing a machine where a container is supported by adjustable legs in order to have the machine perfectly vertical on its support, said container containing a filter opening into a discharge duct and supporting at its upper portion a cylinder, said cylinder containing, in its lower portion, on the one hand a motor and reduction gear assembly driving a central vertical shaft, said assembly being covered by a bottom made of a shaped plate, formed with a radial opening, connected to a nozzle opening above the abovementioned filter, then a disc driven by the shaft and coated on its upper portion with a abrasive layer and having at least one boss in relief for the stirring of the products to clean in cooperation with the inner smooth wall of the cylinder, the bottom of the disc comprising moreover elements for facilitating the disengagement, in cooperation with the shaped plate, of the scraps and washing liquid by causing, by the rotation of the disc, a slight depression projecting a liquid plus scraps mixture to a discharge nozzle, finally the cylinder being closed by a tight cover through which are introduced the products to be cleaned while said products are discharged after having been cleaned through a door placed in front of a discharge chute.

According to a further feature of the invention, the shaped plate is formed on its outer surface, with a hollow furrow of helical shape adapted for cooperating with fins placed under the disc, said fins having at their lower portion a shape matching that of the hollow furrow in order to promote a depression facilitating the discharge of the cleaning liquid and scraps.

Various other features of the invention will become more apparent from the following detailed description.

BRIEF DESCRIPTION OF THE DRAWINGS

An embodiment of the invention is shown, by way of example, in the accompanying drawings, wherein;

FIG. 2 is an enlarged partial sectional view of a detail of FIG. 1;

FIG. 3 is an enlarged sectional view of another embodiment of a detail of FIG. 2;

FIG. 4 is a plan view of one of the elements of the machine.

DETAILED DESCRIPTION OF THE INVENTION

Figure 1:
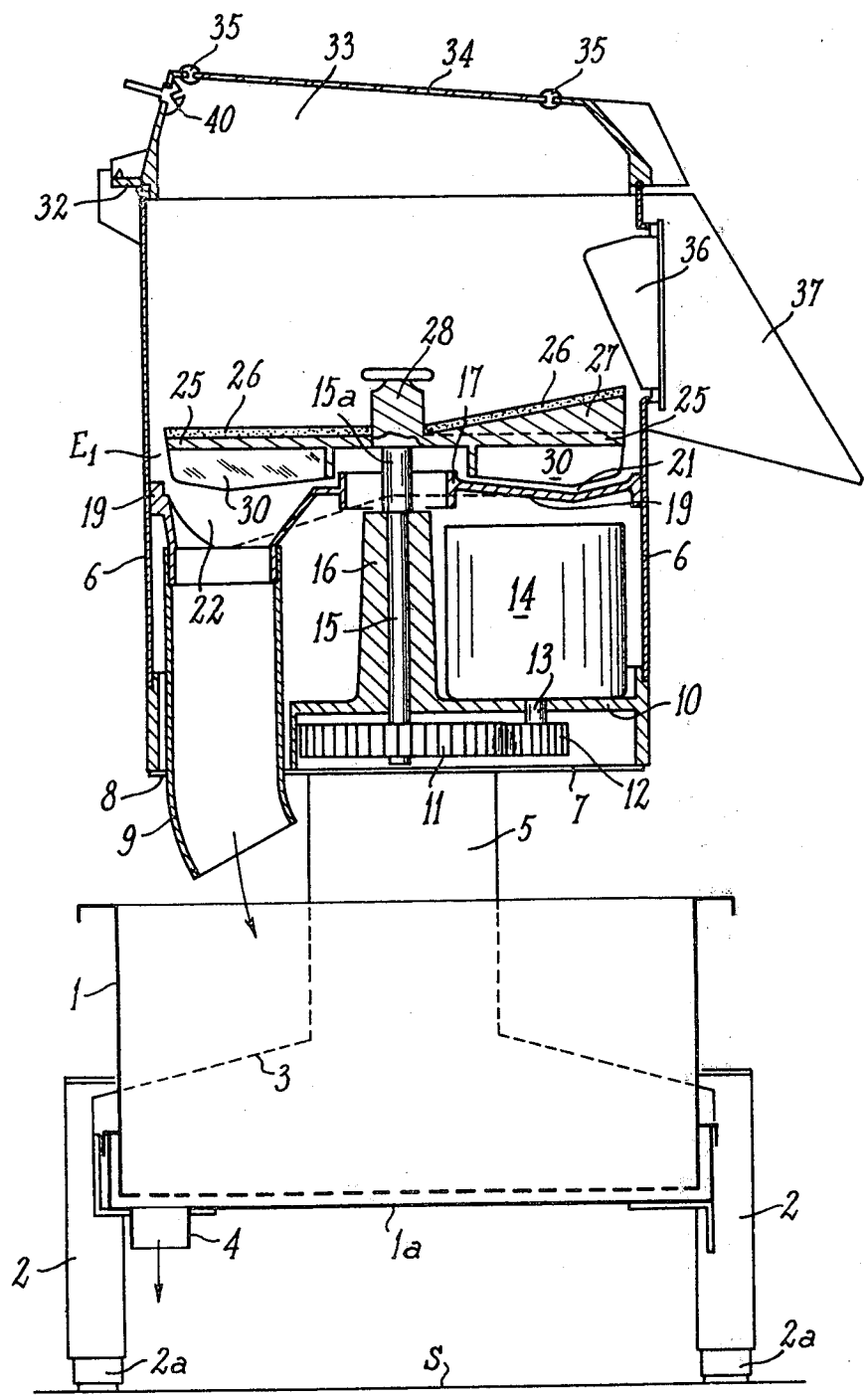
FIG. 1 is an elevation view, partly in cross-section, of the machine for cleaning and peeling vegetables, particularly onions and garlics.

There is shown in FIG. 1 a container 1 of substantially cylindrical shape, mounted on legs 2 which can be three or four in number and which carry the container 1. Lower portion 2a of the legs 2 is adjustable in order to provide a perfect stability of the machine on a support S which can be the ground or a table. Moreover, the adjusting device placed at 2a for the legs 2 provides a perfect horizontality of bottom 1a of the container which contains a filter 3 of substantially circular shape at its base. The container 1 comprises, on its bottom 1a, a discharge union 4 for discharging the filtered water towards an outlet which can be, for example, a sewer. The filter 3 supports, at its upper portion, a head 5 on which bears the machine properly so called. The machine is formed by a cylinder 6 comprising a very reinforced bottom 7. The bottom 7 is formed with an opening 8 through which extends a nozzle 9 opening on the filter 3. The bottom 7 of the cylinder 6 contains a casing 10 in which are placed pinions 11 and 12, the pinion 12 being connected to the shaft 13 of a motor 16 while the pinion 11 is mounted on the shaft 15 journaled in a vertical bearing 16 in order to open at its upper portion 15a in a ring 17 fixed in the centre of a shaped plate 19. This shaped plate 19, forming the bottom of the working tank of the machine, has an outer surface 20 comprising a hollow furrow 21 (FIG. 8) starting practically at zero from an opening 22 placed above the nozzle 9 in order to reach a point 23 which is the deepest just at the inlet of the nozzle 9.

As shown in FIG. 1, the upper portion 15a of the shaft 15 which bears on the upper portion of the vertical bearing 16 carries a disc 25 which is substantially plane on its upper face and which comprises an abrasive coating 26. However, top of the disc 25 comprises at least one boss 27 radially placed from the hub 28 rigidly connecting the disc 25 to the upper portion 15a of the shaft 15. The diameter of the disc 25 is slightly smaller than the inner diameter of cylinder 1 the walls of which are smooth and thereby provide, as is clearly shown in FIG. 1, a circular space $E_1$ the function of which will be explained hereafter.

The bottom of the disc 25, which is plane, is formed with fins 30 having substantially a triangular shape matching very closely the shape of the hollow furrow 21 while being spaced from the latter by a distance as small as possible in order that these fins will form suction members for, on the one hand, promoting the discharge of the scraps, and on the other hand, creating a slight depression promoting the discharge not only of the aforementioned scraps, but also of the water. As this is normal with a vegetable cleaning and peeling machine, there is at the upper portion, connected by a hinge 32, a cover 33 the upper face of which comprises a glass panel 34 and a sealing gasket 35 thereby providing tightness between the cover and the cylinder 6 of the machine. In the front portion of the machine there is also provided a discharge door 36 for discharging the cleaned vegetables as well as a discharge chute 37. As shown in FIG. 1, a projecting beak 40 allows spraying water at the inlet of the machine parallel to the glass panel 34; the spray constantly cleans the glass panel 34 so that the user can control the cleaning state of the vegetables placed inside the machine.

The machine operates in the following manner.

After having lifted the cover 33 and when the vegetables to be cleaned such as onions have been placed inside the machine, and when the cover 33 has been closed back and the door 36 has been checked as well closed, the water feed to the injection beak 40 is opened, and then by setting the motor 4 under voltage the disc 25 is driven in rotation through the shaft 13, pinions 11 and 12 and shaft 15. The rotation of the disc 25 causes, on the one hand, a stirring of the mass of vegetables between the disc and the inner wall of cylinder 6 and, at the same time due to the abrasive coating 26, a slow peeling or skinning of the outer pellicles of the vegetables to be cleaned. Fast rotation of the disc 25 causes the creation of a vortex between the lower portion of the fins 30 and the upper portion of the shaped plate 19 which sucks, on the one hand, the water, and on the other hand, the pellicles removed from the peeled vegetables, whereby said pellicles can easily pass between the inner face of the cylinder 6 and the edge of the disc 25 due to the space $E_1$.

Thus, the scraps and the water are hurled into the opening 22, then into the nozzle 9 and fall on the filter 3 which separates the large impurities from the water, which, by being filtered by the bottom of filter 3, is then directed through the union 4 toward an evacuation location. The opening 22, the wall 22a of which is strongly slanted (see FIG. 2), enables absorbing very quickly the scraps and water since, as hereabove indicated, a pumping phenomenon occurs which allows a very quick discharge of the water and scraps.

As shown in FIG. 3, the bosses 27 which are in relief (see FIGS. 1 and 2) can be hollow so as to form a complementary element 27a completing the pumping effect hereabove described under the only condition that the distance d from the bottom of the hollow boss 27a to the hollow furrow 21 of the shaped plate 19 is extremely small.

As a non limiting example, it can be stated for example that the outer diameter of the plate 25 is from 3 to 6% less than the inner diameter of the cylinder 6. Thus due to the substantially helical shape of the upper face of the shaped plate 19 and of the fins 30 placed under the disc 25, it can be asserted that a perfect evacuation of the scraps is obtained.

So as not to damage the vegetables in cylinder 1, the inner wall of the cylinder 1 is smooth and all the junctions with the cover 33 and door 36 are provided with rounded corners so as to avoid any sudden shock while providing at the same time a perfect water tightness of the machine so that the machine does not leak the water cleaning the vegetables and evacuating the scraps.

The abrasive coating 26 can be more of less fine according to the work in view, and moreover several bosses in relief 27 or hollow 27a can be arranged radially according to the work to be performed and to the vegetables to process. This is made possible by adapting a suitable disc 25 according to needs. These pre-mentioned bosses have a progressive ramp which promotes the work under excellent conditions. In fact, the machine hereabove described can peel vegetables, onions, fruit, scrape shells (mussels), clean offals (paunches, entrails, feet, head of animals), etc.

In some cases and as shown in FIG. 1, the plate 50 has a helical shape in order to form with the furrow 21 of the shaped plate 19 a centrifugal pump member providing a very fast evacuation of the scraps, above all when the scraps are viscous and sticky.

Figure 5:
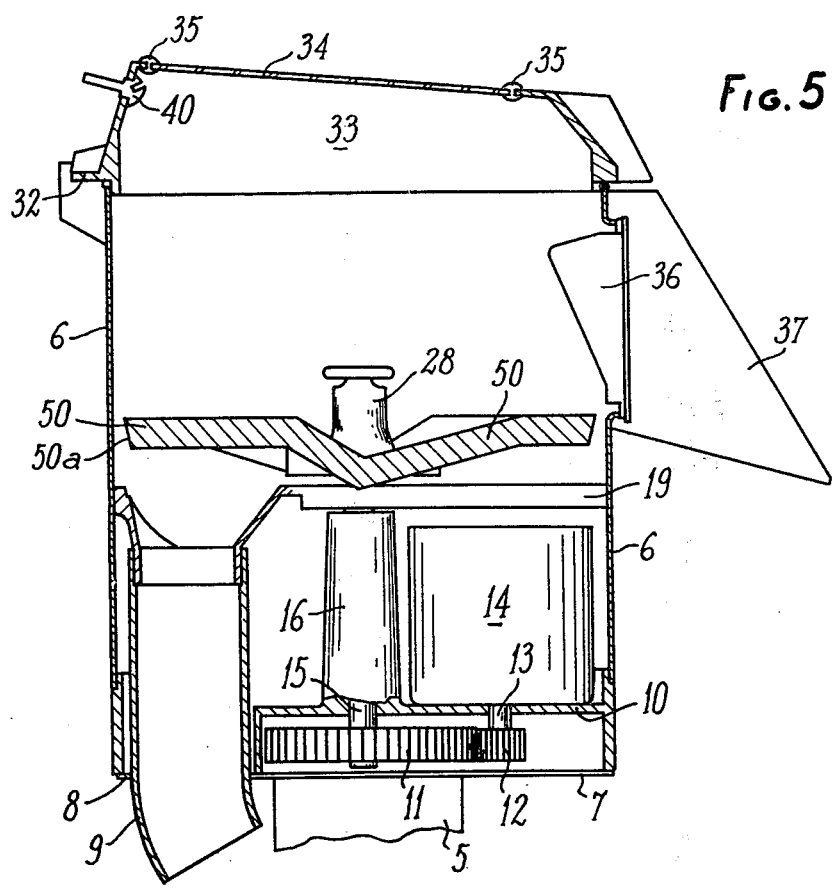
FIG. 5 is an elevational-sectional view showing a slight construction modification of the machine.

It is also possible to provide a disc 50 the outer periphery of which is slightly inclined as shown in FIG. 5 and the minimum distance between said inclined edge 50a and the inner wall of cylinder 6 is between 5 and 9 mm for example. A disc with a cylindrical periphery and a wall of cylinder 6 slightly shaped as a collar or ferrule 106 (see FIG. 6) can also be provided. Likewise, the outer edge of the disc 50 can be formed with helical scores 107 promoting entrainement of the scraps (see FIG. 7).

As indicated hereabove, the shaped plate 19 is formed with a hollow furrow 21 of helical shape, but it can also have a spiral shape.

Figures 6, 8:
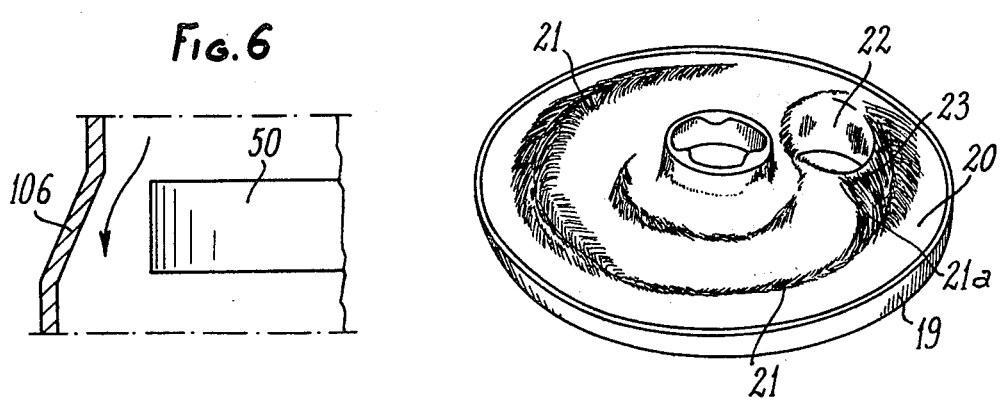
FIG. 6 is a partial sectional view of a slight variation of an element of the machine.
FIG. 8 is a restricted perspective view of the bottom of the tank.
Figure 7:
FIG. 7 is a partial elevation view of a modification of the vertical edge of the turning plate.

In some cases and in order to promote evacuation of the water and scraps, the hollow furrow 21 having either a helical shape or a spiral shape, is prolongated by a groove 21a as shown in FIG. 8.

The invention is not limited to the embodiment shown and described in detail and various modifications can be carried out without departing from its scope as shown in the appended claims.

What is claimed is:

1. A machine for peeling and cleaning food products, particularly vegetables such as onions, said machine comprising a container supported by adjustable legs so a to enable vertical adjustment of said container, a filter in said container opening into a discharge duct, said filter having an upper portion support a cylinder having a base plate, a motor and reduction gear assembly mounted on said base plate and driving a central vertical shaft, a shaped plate covering said assembly and having a radial opening connected to a nozzle opening above said filter, a disc provided with at least one boss driven by said shaft, said disc having an upper surface coated with an abrasive layer, said cylinder having an open top closed by a releasable water tight cover through which the products to be cleaned are introduced, a discharge chute projecting laterally from said cylinder through which said products are discharged after having been cleaned, a door normally obturating said discharge chute, and means for introducing a washing liquid into said cylinder, wherein said disc has a diameter slightly smaller than the inner diameter of said cylinder such as to form an annular space therebetween, the shaped plate in said cylinder has a top shaped so as to cooperate with said rotating disc, said disc having a bottom comprising fins promoting disengagement of scraps and said washing liquid from said products by causing a pumping effect projecting a mixture of said washing liquid and scraps toward said discharge nozzle through said annular space.

2. The peeling and cleaning machine of claim 1, wherein the shaped plate is formed on its outer surface with a hollow furrow having a helical shape provided for cooperating with said fins on the bottom of said disc, said fins having at their lower portion a shape matching that of the hollow furrow so as to cause said pumping effect creating first a depression, then a compression promoting the evacuation of the washing liquid and scraps to the discharge nozzle through said annular space.

3. The peeling and cleaning machine of claim 1, wherein the disc has a diameter smaller by 3 to 6% than the inner diameter of the cylinder.

4. The peeling and cleaning machine of claim 1, wherei said boss is in the form of a hollow depression, the distance from the lower portion of said boss to the shaped plate being extremely small so as to cause a pumping effect creating first a depression, then a compression which promotes the evacuation of cleaning liquid and scraps.

5. The peeling and cleaning machine of claim 2, wherein the hollow furrow of the shaped plate has a spiral shape.

6. The peeling and cleaning machine of claim 1, wherein said disc has a peripheral edge surface which is slightly frustoconical such that said annular space is of progressively increasing area from the top to the bottom of said disc.

7. The peeling and cleaning machine of claim 1, wherein said disc has a peripheral edge formed with helical scores promoting evacuation of the scraps and washing liquid.

8. The peeling and cleaning machine of claim 1, wherein said disc has a peripheral edge having substantially the shape of a ferrule or collar promoting evacuation of the scraps and washing liquid.

9. The peeling and cleaning machine of claim 1, wherein said boss projects above the upper surface of said disc.

10. The peeling and cleaning machine of claim 1, wherein said cylinder has a wall surface proximate said disc which is slightly frustoconical such that said annular space is of progressively increasing area from the top to the bottom of said disc.

* * * * *

UNITED STATES PATENT AND TRADEMARK OFFICE
CERTIFICATE OF CORRECTION

PATENT NO. : 4,442,764
DATED : April 17, 1984
INVENTOR(S) : Pierre Henri Bos et al It is certified that error appears in the above-identified patent and that said Letters Patent are hereby corrected as shown below:

Col. 1, line 36, change "prevents" to --presents--.

Col. 3, line 9, change "16" to --14--, line 59, change "4" to --14--.

Signed and Sealed this

Twenty-fourth Day of July 1984

[SEAL]

Attest:

*Attesting Officer*

GERALD J. MOSSINGHOFF

*Commissioner of Patents and Trademarks*